(12) United States Patent
Inaba et al.

(10) Patent No.: US 8,792,727 B2
(45) Date of Patent: Jul. 29, 2014

(54) IMAGE PROCESSING DEVICE, IMAGE PROCESSING METHOD, AND PROGRAM

(75) Inventors: Seijiro Inaba, Kanagawa (JP); Atsushi Kimura, Tokyo (JP); Ryota Kosakai, Tokyo (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 13/423,867

(22) Filed: Mar. 19, 2012

(65) Prior Publication Data

US 2012/0275711 A1  Nov. 1, 2012

(30) Foreign Application Priority Data

Apr. 28, 2011  (JP) ................................. 2011-100836

(51) Int. Cl.
*G06K 9/46* (2006.01)

(52) U.S. Cl.
USPC .......................................... 382/201; 382/103

(58) Field of Classification Search
CPC ..... G06K 9/46; G06K 9/4609; G06K 9/4614; G06K 9/00268
USPC ................................................... 382/201, 103
See application file for complete search history.

(56) References Cited

U.S. PATENT DOCUMENTS

| | | | | | |
|---|---|---|---|---|---|
| 5,818,959 | A | * | 10/1998 | Webb et al. | 382/154 |
| 6,041,133 | A | * | 3/2000 | Califano et al. | 382/124 |
| 6,975,755 | B1 | * | 12/2005 | Baumberg | 382/154 |
| 7,856,125 | B2 | * | 12/2010 | Medioni et al. | 382/118 |
| 8,259,998 | B2 | * | 9/2012 | Okugi et al. | 382/103 |
| 2002/0003900 | A1 | * | 1/2002 | Kondo | 382/199 |
| 2005/0088515 | A1 | * | 4/2005 | Geng | 348/47 |
| 2005/0196017 | A1 | * | 9/2005 | Altherr et al. | 382/103 |
| 2006/0078197 | A1 | * | 4/2006 | Mitsumoto et al. | 382/154 |
| 2007/0081718 | A1 | * | 4/2007 | Rubbert et al. | 382/154 |
| 2008/0107307 | A1 | * | 5/2008 | Altherr | 382/107 |
| 2008/0232715 | A1 | * | 9/2008 | Miyakawa et al. | 382/284 |
| 2008/0240574 | A1 | * | 10/2008 | Weon Geun et al. | 382/201 |
| 2009/0028455 | A1 | * | 1/2009 | Nakamura et al. | 382/254 |
| 2009/0041360 | A1 | * | 2/2009 | Ohira et al. | 382/201 |
| 2009/0110331 | A1 | * | 4/2009 | Takeshima et al. | 382/299 |
| 2009/0295791 | A1 | * | 12/2009 | Aguera y Arcas et al. | 345/419 |
| 2009/0296984 | A1 | * | 12/2009 | Nijim et al. | 382/103 |
| 2010/0074531 | A1 | * | 3/2010 | Tanaka | 382/201 |
| 2010/0104256 | A1 | * | 4/2010 | Tsurumi | 386/69 |
| 2010/0149210 | A1 | * | 6/2010 | Matsunaga et al. | 345/625 |

(Continued)

OTHER PUBLICATIONS

Brown, M.; Szeliski, R.; Winder, S., "Multi-image matching using multi-scale oriented patches," Computer Vision and Pattern Recognition, 2005. CVPR 2005. IEEE Computer Society Conference on , vol. 1, no., pp. 510,517 vol. 1, Jun. 20-25, 2005.*

David G. Lowe,"Distinctive Image Features from Scale-Invariant Keypoints",International Journal of Computer Vision, 2004,Kluwer Academic Publishers,2004.*

E. Rosten et al., "Machine Learning for High-Speed Corner Detection," European Conference on Computer Vision (ICCV), vol. 1, pp. 430-443, 2006.

(Continued)

*Primary Examiner* — Stephen R Koziol
*Assistant Examiner* — Shaghayegh Azima
(74) *Attorney, Agent, or Firm* — Sony Corporation (57) ABSTRACT

There is provided an image processing device including a feature point detection unit configured to detect feature points from an image, a reliability computation unit configured to compute reliability of each of the detected feature points, and a removal processing unit configured to remove some of the detected feature points on the basis of the reliability so that the number of the remaining feature points in each split region that is obtained by splitting the image into a plurality of regions is within a restricted number of feature points.

15 Claims, 5 Drawing Sheets

(56) References Cited

U.S. PATENT DOCUMENTS

| | | |
|---|---|---|
| 2010/0185716 A1* | 7/2010 | Nakamura et al. ............ 708/650 |
| 2011/0038545 A1* | 2/2011 | Bober et al. ................. 382/190 |
| 2011/0135158 A1* | 6/2011 | Nishino et al. ................ 382/107 |
| 2011/0235899 A1* | 9/2011 | Tanaka ......................... 382/154 |
| 2012/0045135 A1* | 2/2012 | Yanase et al. ................ 382/201 |
| 2012/0114202 A1* | 5/2012 | Manson ....................... 382/128 |
| 2012/0141033 A1* | 6/2012 | Yu et al. ....................... 382/195 |
| 2012/0162454 A1* | 6/2012 | Park et al. .................. 348/208.6 |
| 2012/0257016 A1* | 10/2012 | Nakajima et al. .............. 348/46 |
| 2012/0269446 A1* | 10/2012 | Nakajima .................... 382/201 |

OTHER PUBLICATIONS

D. G. Lowe, "Distinctive Image Features from Scale-Invariant Keypoints," International Journal of Computer Vision (IJCV), vol. 60, No. 2, pp. 91-110, 2004.

C. Harris et al., "A Combined Corner and Edge Detector," In Alvey Vision Conference, pp. 147-151, 1988.

M. Brown, et al., "Multi-Image Matching Using Multi-Scale Oriented Patches," Computer Vision and Pattern Recognition (CVPR), vol. 1, pp. 510-517, 2005.

* cited by examiner

IMAGE PROCESSING DEVICE, IMAGE PROCESSING METHOD, AND PROGRAM

BACKGROUND

The present technology relates to an image processing device, an image processing method, and a program. More specifically, the present technology is directed to removing some of feature points detected from an image in a spatially uniform manner.

Conventionally, in various circumstances such as when an object is searched for from an image, when a moving object is detected from an image sequence, or when alignment of a plurality of images is performed, it has become necessary to match identical objects between the plurality of images.

As a method of matching identical objects, a method called block matching or a feature point-based method is used.

In block matching, a given image is split into block regions, and SAD (Sum of Absolute Difference) or NCC (Normalized Cross Correlation) is computed. Then, on the basis of the computed SAD or NCC, a region having high similarity to each block is searched for from another image. This method involves quite a high computational cost as it is necessary to compute the similarity between block regions while gradually shifting the block center coordinates within the search range. Further, as it is necessary to search for a corresponding position even in a region that is difficult to be matched, the processing efficiency is low.

In the feature point-based method, a position that is easily matched, such as a corner of an object or a picture in an image, is first detected as a feature point. Methods of detecting feature points come in a variety of types. Representative methods include a Harris corner detector (see C. Harris, M. J. Stephens, "A combined corner and edge detector", In Alvey Vision Conference, pp. 147-152, 1988), FAST (see Edward Rosten, Tom Drummond, "Machine learning for high-speed corner detection", European Conference on Computer Vision (ICCV), Vol. 1, pp. 430-443, 2006), and DoG (Difference of Gaussian) maxima (see David G. Lowe, "Distinctive Image Features from Scale-Invariant Keypoints", International Journal of Computer Vision (IJCV), Vol. 60, No. 2, pp. 91-110, 2004).

When feature points detected as described above are matched between two images, it becomes possible to perform alignment of the images. For example, an optimum image transformation matrix such as an Affine conversion matrix or a projection transformation matrix (homography), which describes the relationship between the coordinate systems of two images, is determined from the feature point coordinates and the correspondence relationship, using a robust estimation method. Using such an image transformation matrix allows alignment of the images.

Meanwhile, when feature points are detected from an image containing fine pictures (e.g., an image containing many trees or grasses), there may be cases where a large number of feature points are detected. Herein, if a large number of feature points are detected, a time required to search for a matching point of each feature point or compute an image transformation matrix becomes long. Therefore, if a first method of adjusting a threshold, which is regarded as a feature point, is used, it becomes possible to control the number of feature points. However, when the number of feature points is controlled by adjusting a threshold, there may be cases where the feature points are distributed in a spatially non-uniform manner. Meanwhile, in a second method called "Non Maximum Suppression," the reliability (score) as a feature point is determined for each feature point, and only the feature points having higher scores than the neighboring feature points are left, whereby the number of the feature points is reduced. In the second method, all the feature points having high scores are left. Thus, the number of the feature points are dependent on the design of the picture, and thus it is impossible to control the number of feature points so that a desired number of feature points are left. In addition, it is impossible to remove feature points in a spatially uniform manner. Therefore, a method called "ANMS (Adaptive Non Maximal Suppression)" that improves the first and second methods is proposed (see M. Brown, R. Szeliski, S. Winder, "Multi-Image Matching Using Multi-Scale Oriented Patches", Computer Vision and Pattern Recognition (CVPR), Vol. 1, pp. 510-517, 2005).

SUMMARY

By the way, when ANMS is used, it is possible to remove feature points in a spatially uniform manner while controlling the upper limit of the number of the remaining feature points using a parameter. In this method, it is necessary to, for each feature point, first compute the distance (hereinafter referred to as a radius) between each feature point and a feature point whose coordinates are close among the feature points having higher scores than each feature point. Further, it is also necessary to store the coordinates and the radii of all feature points into memory. The size of the radius is first set to "0," and the number of feature points at that time is counted, and if the counted number of the feature points is higher than the set upper limit, the size of the radius is increased a little. Such a process is repeated, and the removing process terminates when the number of the remaining feature points is within the set upper limit Therefore, a high-speed CPU and high-capacity memory are needed.

In light of the foregoing, it is desirable to provide an image processing device, an image processing method, and a program that can remove some of feature points in a spatially uniform manner with a simple configuration at a high speed.

According to a first aspect of the present technology, there is provided an image processing device including a feature point detection unit configured to detect feature points from an image, a reliability computation unit configured to compute reliability of each of the detected feature points, and a removal processing unit configured to remove some of the detected feature points on the basis of the reliability so that the number of the remaining feature points in each split region that is obtained by splitting the image into a plurality of regions is within a restricted number of feature points.

In this technique, feature points are detected from an image by the feature point detection unit. In addition, the reliability of each of the detected feature points is computed by the reliability computation unit. Further, in the removal processing unit, the image is split into a plurality of regions, and the detected feature points are removed in order of increasing reliability so that the number of the remaining feature points is within a restricted number of feature points set for each split region. Herein, when a corner is detected as a feature point from the image, the strength of the corner is used as the reliability. In addition, when the feature point is extracted on the basis of a difference between scale images, which have been generated by smoothing the image with a predetermined smoothness in a stepwise manner, the difference value is used as the reliability. In addition, a three-dimensional region obtained by adding a new dimension to a two-dimensional image is split into a plurality of regions so that feature points are removed from each split region.

According to a second aspect of the present technology, there is provided an image processing method including detecting feature points from an image, computing reliability of each of the detected feature points, and removing some of the detected feature points on the basis of the reliability so that the number of the remaining feature points in each split region that is obtained by splitting the image into a plurality of regions is within a restricted number of feature points.

According to a third aspect of the present technology, there is provided a program for causing a computer to execute the procedures of detecting feature points from an image, computing reliability of each of the detected feature points, and removing some of the detected feature points on the basis of the reliability so that the number of the remaining feature points in each split region that is obtained by splitting the image into a plurality of regions is within a restricted number of feature points.

Note that the program of the present technology is a program that can be provided to a computer that can execute various program codes, by means of a storage medium provided in a computer-readable format, a communication medium, for example, a storage medium such as an optical disc, a magnetic disk, or semiconductor memory, or a communication medium such as a network. When such a program is provided in a computer-readable format, a process in accordance with the program is implemented on the computer.

According to the present technology described above, feature points are detected from an image. In addition, the reliability of each of the detected feature points is computed. Further, the image is split into a plurality of regions, and some of the detected feature points are removed on the basis of the reliability so that the number of the remaining feature points in each split region is within the restricted number of feature points. Therefore, the feature points can be removed in a spatially uniform manner with a simple configuration at a high speed.

DETAILED DESCRIPTION OF THE EMBODIMENTS

Hereinafter, preferred embodiments of the present technology will be described in detail with reference to the appended drawings. Note that, in this specification and the appended drawings, structural elements that have substantially the same function and structure are denoted with the same reference numerals, and repeated explanation of these structural elements is omitted.

Note that the description will be given in the following order.
1. Schematic Configuration of Imaging Device
2. Configuration of Portion in which Object Matching Process is Performed in Image Processing Unit
3. Removing Process <1. Configuration of Imaging Device>

Figure 1:
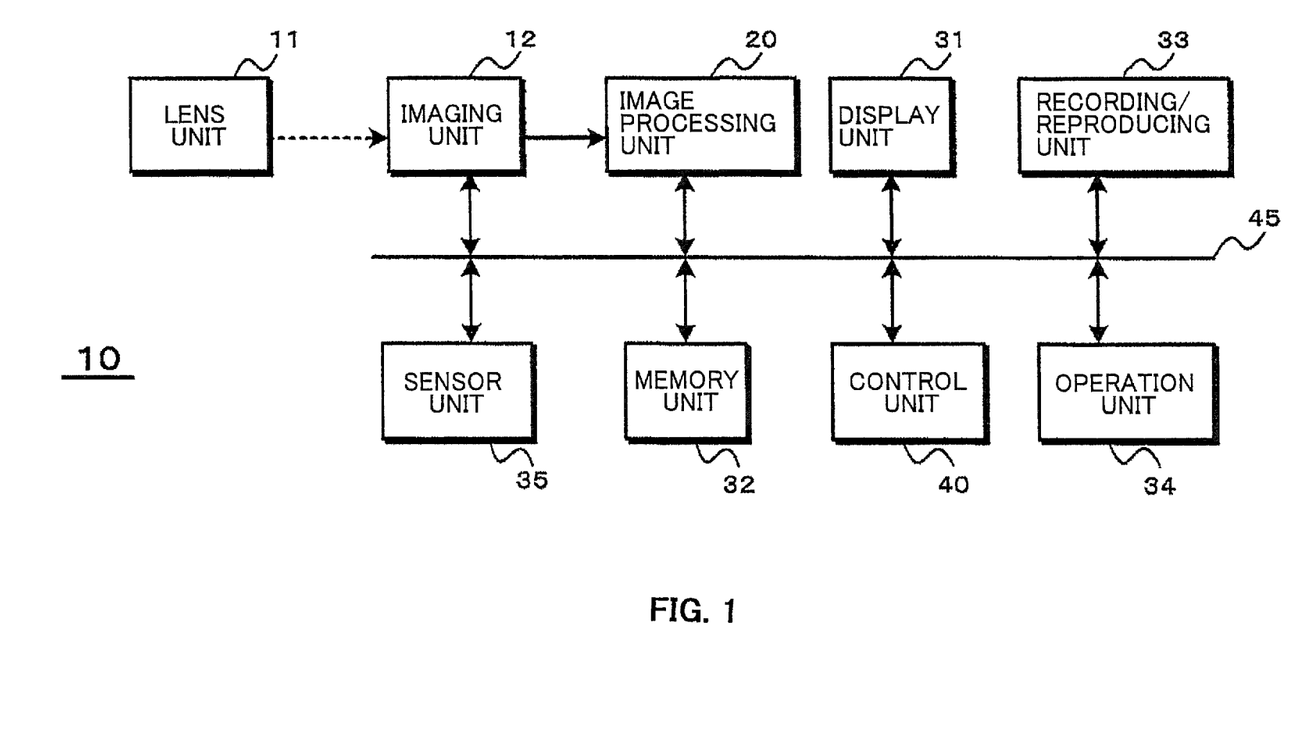
FIG. 1 is a diagram showing a schematic configuration of an imaging device.

FIG. 1 is a diagram showing a schematic configuration of an imaging device that uses an image processing device in accordance with an embodiment of the present technology.

An imaging device 10 includes a lens unit 11, an imaging unit 12, an image processing unit 20, a display unit 31, a memory unit 32, a recording device unit 33, an operation unit 34, a sensor unit 35, and a control unit 40. In addition, each unit is connected via a bus 45.

The lens unit 11 includes a focus lens, a zoom lens, a diaphragm mechanism, and the like. The lens unit 11 drives the lens in accordance with an instruction from the control unit 40, and forms an optical image of a subject on an image plane of the imaging unit 12. In addition, the lens unit 11 adjusts the diaphragm mechanism so that the optical image formed on the image plane of an image sensor 12 has desired brightness.

The imaging unit 12 includes an image sensor such as a CCD (Charge Coupled Device) image sensor or a CMOS (Complementary Metal Oxide Semiconductor) image sensor, a driving circuit that drives the image sensor, and the like. The image sensor 12 performs photoelectric conversion to convert an optical image formed on the image plane of the image sensor into an electrical signal. Further, the imaging unit 12 removes noise from the electrical signal and performs analog/digital conversion, and further generates an image signal and outputs it to the image processing unit 20 or the memory unit 32 via the image processing unit 20.

The image processing unit 20 performs, on the basis of a control signal from the control unit 40, various camera signal processing on the image signal or performs an encoding process, a decoding process, or the like on the image signal. Further, the image processing unit 20 performs, on the basis of a control signal from the control unit 40, an object matching process or performs image processing using the result of the matching process. Note that the object matching process and the image processing using the result of the matching process are described below.

The display unit 31 includes liquid crystal display elements and the like, and displays an image on the basis of the image signal processed by the image processing unit 20 or the image signal stored in the memory unit 32.

The memory unit 32 includes semiconductor memory such as DRAM (Dynamic Random Access Memory), and temporarily stores image data to be processed by the image processing unit 20, image data processed by the image processing unit 20, control programs and various data in the control unit 40, and the like.

For the recording device unit 33, a recording medium such as semiconductor memory like flash memory, a magnetic disk, an optical disc, or a magneto-optical disk is used. The recording device unit 33 records an image signal, which has been generated by the imaging unit 12 during an imaging process, encoded by the image processing unit 20 with a predetermined encoding method, and stored in the memory unit 32, for example, on the recording medium. In addition, the recording device unit 33 reads the image signal recorded on the recording medium into the memory unit 32.

The operation unit 34 includes an input device such as a hardware key like a shutter button, an operation dial, or a touch panel. The operation unit 34 generates an operation signal in accordance with a user input operation, and outputs the signal to the control unit 40.

The sensor unit 35 includes a gyro sensor, an acceleration sensor, a geomagnetic sensor, a positioning sensor, or the like, and detects various information. Such information is added as metadata to the captured image data, and is also used for various image processing or control processes.

The control unit 40 controls the operation of each unit on the basis of an operation signal supplied from the operation unit 34, and controls each unit so that the operation of the imaging device 10 becomes an operation in accordance with a user operation.

<2. Configuration of Portion in which an Object Matching Process is Performed in Image Processing Unit>

Figure 2:
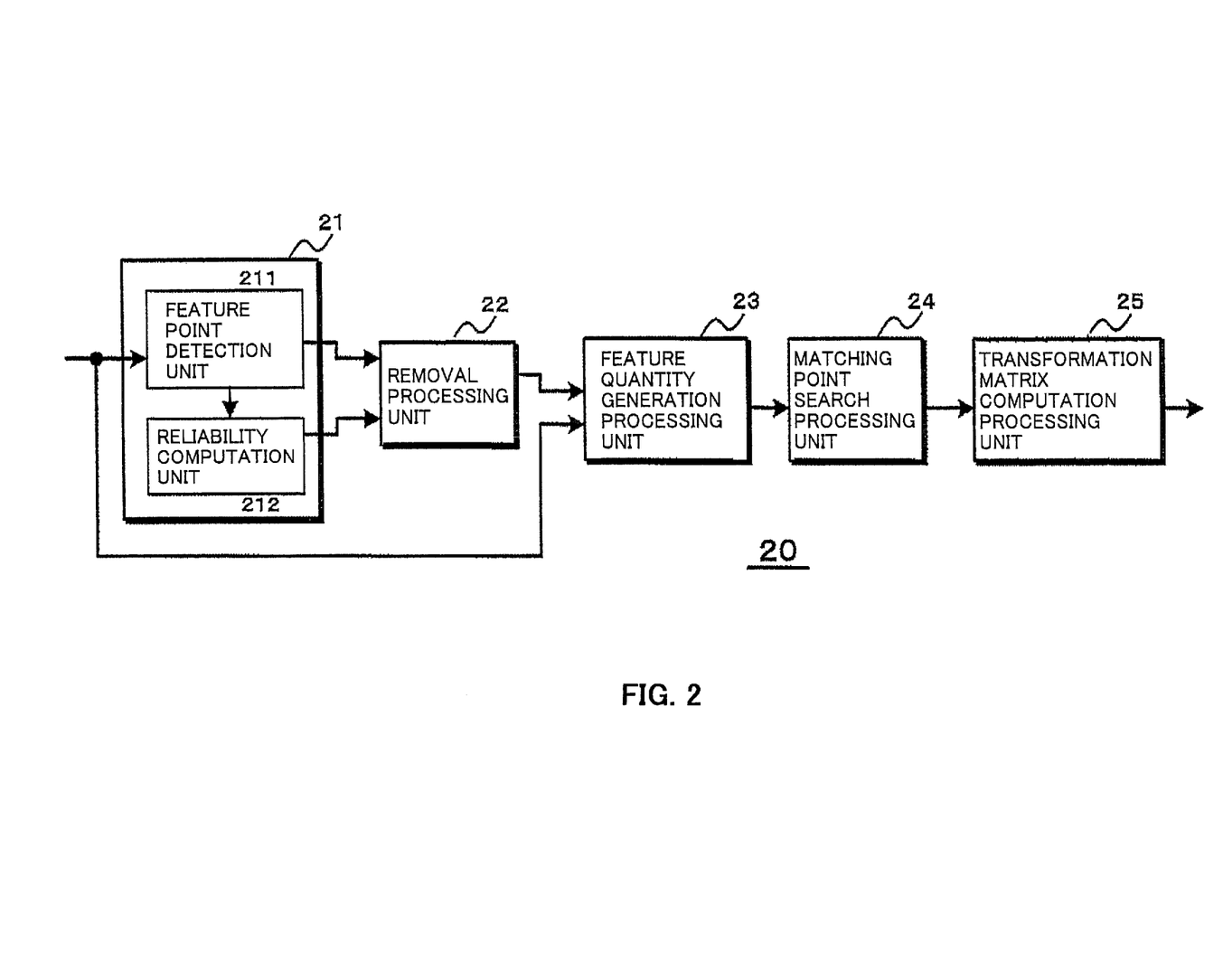
FIG. 2 is a diagram exemplarily showing the configuration of a portion in which an object matching process is performed in an image processing unit.

FIG. 2 exemplarily shows a configuration of a portion in which an object matching process is performed in the image processing unit 20. The image processing unit 20 includes a feature point detection processing unit 21 and a removal processing unit 22 that removes some of the feature points. Further, the image processing unit 20 also includes a feature quantity generation processing unit 23 that generates feature quantities to be used for a process of matching identical objects between two images, a matching point search processing unit 24 for matching identical objects on the basis the feature quantities, and a transformation matrix computation processing unit 25.

The feature point processing unit 21 includes a feature point detection unit 211 that detects feature points from the captured image, and a reliability computation unit 212 that computes the reliability of each of the detected feature points. The feature point detection unit 211 detects feature points using, for example, a Harris corner detector, FAST, DoG-maxima, or the like. Alternatively, the feature point detection unit 211 may detect feature points using a Hessian filter or the like. The reliability computation unit 212 computes the reliability (score), as a feature point, of each of the feature points detected by the feature point detection unit 211. The feature point processing unit 21 outputs the coordinates and reliability of each of the detected feature points to the removal processing unit 22.

The removal processing unit 22 performs a process of removing some of the feature points detected by the feature point processing unit 21. When the number of the detected feature points is large, a processing time, which is required for a matching point search process performed thereafter, becomes long. In addition, adjacent feature points or too many feature points have a tendency to cause mismatch between images. Thus, the removal processing unit 22 removes some of the feature points using the reliability (score) of each feature point so that the remaining feature points are dispersed in a spatially uniform manner. Specifically, the image is split into a plurality of regions, and some of the feature points are removed using the reliability of each feature point so that the number of the remaining feature points in each split region will be within the restricted number of feature points. Note that the removal process is described below.

The feature quantity generation processing unit 23 generates feature quantities that describe a local region including a feature point as a center. The feature quantity generation processing unit 23 performs a feature quantity generation process on each of the feature points remaining after the removal process, and generates, for each feature point, feature quantities corresponding to the local region including the feature point as a center. For the generation of the feature quantities, various methods such as SIFT or SURF can be used. In addition, in the feature quantity generation process, two pixels at given coordinates are selected, and the difference between the pixel values of the two pixels is computed. Then, the result of computation may be compared with a threshold value, and binarized information may be generated on the basis of the comparison result so that it is used as a component of the feature quantities.

The matching point search processing unit 24 searches for feature quantities that are similar between images, and determines feature points whose feature quantities are most similar to be the matching points of the identical object. The components of the feature quantities are binarized data. Thus, exclusive OR is computed for each component of the feature quantities. The result of the exclusive OR operation is, if the components are equal, "0," and if the components are different, "1." Thus, the matching point search processing unit 24 determines a feature point whose total value of the result of exclusive OR operation of each component is the smallest to be a feature point having the highest similarity.

The transformation matrix computation processing unit 25, using a robust estimation method, determines an optimum Affine conversion matrix or a projection transformation matrix (homography), which describes the relationship between the coordinate systems of two images, from the coordinates of the feature point and the coordinates of the matching point obtained by the matching point search processing unit 24. Note that such a matrix will be referred to as an image transformation matrix. That is, if an image transformation matrix is used, it will be possible to transform the coordinate system of one image into the coordinate system of the other image. Therefore, it is possible to, using a plurality of captured images, for example, generate a panoramic image by accurately joining the images such that the object image will have no missing parts or overlapping parts. In addition, when a plurality of captured images are generated, the images can be joined accurately even when the imaging device is tilted, for example.

<3. Removing Process>

Figure 3:
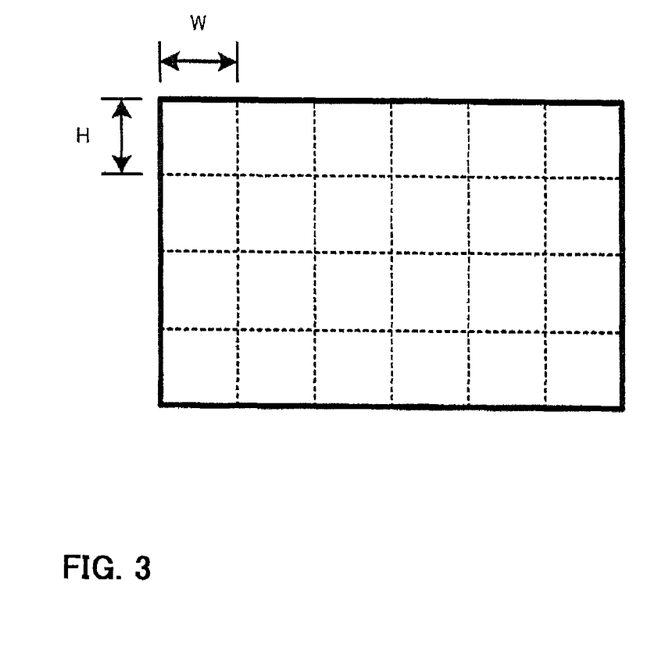
FIG. 3 is a diagram showing an image split in units of blocks.

Next, the removing process will be described. The removal processing unit 22 splits an image into blocks. FIG. 3 exemplarily shows a case where the block size is represented by a vertical direction "H" and a horizontal direction "W." Note that when an image is split into a plurality of blocks in predetermined size, it is acceptable if a block with a size smaller than the predetermined size is generated at the end of the image.

Figure 4:
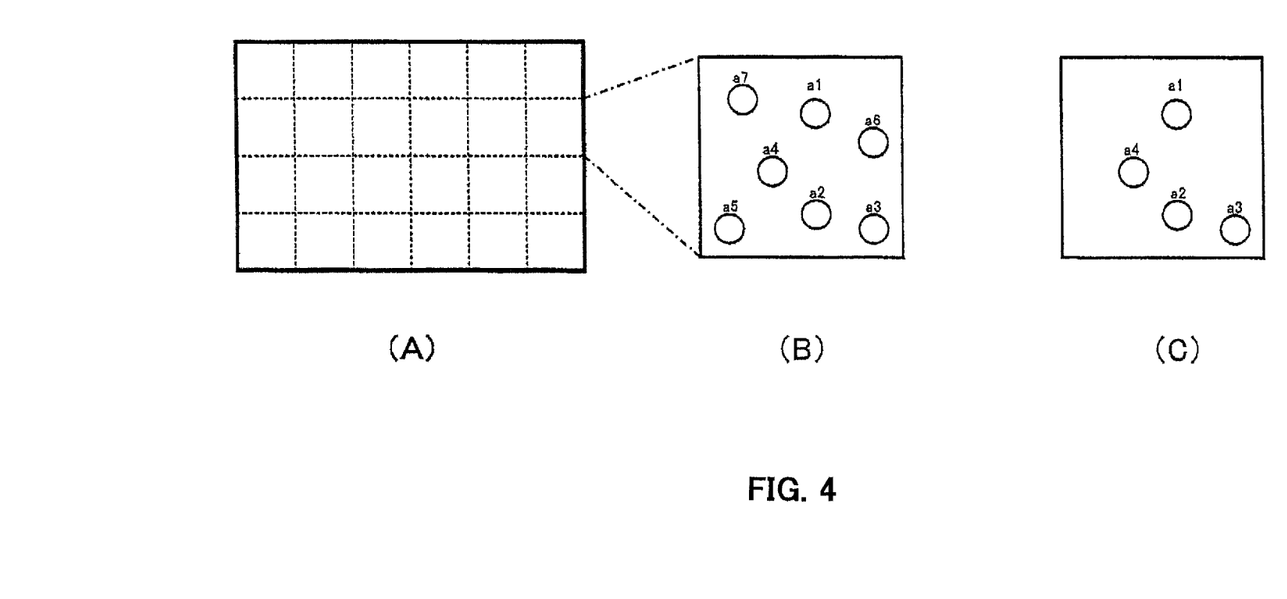
FIG. 4 is a diagram showing a process of removing some of feature points.

FIG. 4 is a diagram illustrating the removing process. Suppose, as shown in (A) and (B) in FIG. 4, that seven feature points are detected in a single split block by a feature point detection process, for example. The removal processing unit 22 ranks the detected feature points on the basis of the reliability (score) of each feature point. Note that in (B) in FIG. 4, the feature points are defined in order of decreasing reliability such that "a1, a2, a3, . . . , a7."

As the reliability of each feature point, if feature points have been detected by performing Harris corner detection in the feature point detection process, for example, a function value (corner strength), which indicates the likeliness of a corner, computed through the corner detection is used as the reliability, and a feature point having a high function value is determined to be a feature point with highly reliability. That is, provided that a pixel value at a given position (x,y) in an image is $I(x,y)$, characteristic values of a matrix M represented by Formula (1) are determined

[Formula 1]

$$M = \begin{bmatrix} \left(\frac{\partial I}{\partial x}\right)^2 & \left(\frac{\partial I}{\partial x}\right)\left(\frac{\partial I}{\partial y}\right) \\ \left(\frac{\partial I}{\partial x}\right)\left(\frac{\partial I}{\partial y}\right) & \left(\frac{\partial I}{\partial y}\right)^2 \end{bmatrix} \quad (1)$$

When two characteristic values α and β in the matrix M are both large, it means that a corner exists at that position. Thus, a function value representing the likeliness of a corner, that is, a function value of the feature point detection function R represented by Formula (2) is used as the reliability. Note that in Formula (2), Det(M) is a value represented by Formula (3) and Tr(M) is a value represented by Formula (4). In addition, symbol k in Formula (4) is a constant.

[Formula 2]

$$R = \text{Det}(M) - kTr(M)^2 \quad (2)$$

$$\text{Det}(M) = \alpha\beta \quad (3)$$

$$kTr(M) = \alpha + \beta \quad (4)$$

Meanwhile, when feature points have been detected through DoG (Difference of Gaussian) maxima, DoG may be used as the reliability and a feature point with a high DoG value may be determined to be a feature point with high reliability. Herein, provided that a pixel value at a position (x,y) is I(x,y), a smooth image L(x,y,σ) can be generated from Formula (5). Note that in Formula (5), "G(x,y,σ)" is a Gauss function represented by Formula (6).

[Formula 3]

$$L(x, y, \sigma) = G(x, y, \sigma) * I(x, y) \quad (5)$$

$$G(x, y, \sigma) = \frac{1}{2\pi\sigma^2} \exp\left(-\frac{x^2 + y^2}{2\sigma^2}\right) \quad (6)$$

Figure 5:
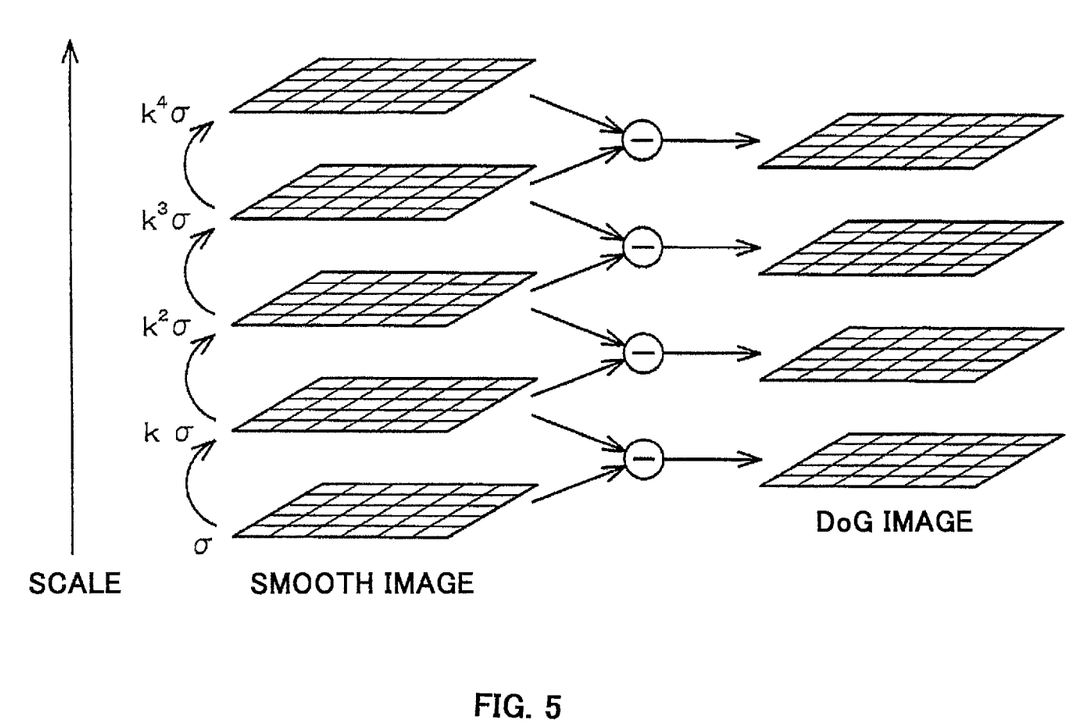
FIG. 5 is a diagram illustrating a DoG image.

Further, as represented by Formula (7) and FIG. 5, a DoG image D(x,y,σ) can be generated by computing the difference between smooth images with different scales. That is, a DoG value can be computed. Note that symbol k in Formula (7) and FIG. 5 indicates the rate of increase.

[Formula 4]

$$D(x, y, \sigma) = L(x, y, k\sigma) - L(x, y, \sigma) \quad (7)$$

The removal processing unit 22, on the basis of the reliability of each feature point, selects a desired number of feature points in order of decreasing reliability, and removes the non-unselected feature points. For example, when the restricted number of feature points in each block is four, the removal processing unit 22 selects four feature points a1 to a4 with high reliability, and removes the feature points a5 to a7 as shown in (C) in FIG. 4. Note that when the number of feature points in each block is less than or equal to four, no feature points are removed.

As described above, the removal processing unit 22, on the basis of the reliability of each feature point, performs a process of selecting a desired number of feature points in order of decreasing reliability and removing the rest of the feature points on a per-block basis. Thus, the feature points that remain after the removing process is performed by the removal processing unit 22 are uniformly dispersed across the entire image.

The removal processing unit 22 can, by performing a removing process as described above, remove feature points with a simple configuration at a high speed so that the remaining feature points are dispersed in a spatially uniform manner.

The image processing unit 20 may also perform the processes of detecting feature points and removing some of the detected feature points for each image with a different scale. In such a case, processes of from the feature point processing unit 21 to the matching point search processing unit 24 are performed on each image with a different scale so that an image transformation matrix is computed by the transformation matrix computation processing unit 25 using the feature points detected from each image with a different scale and matching points. Alternatively, processes of from the feature point processing unit 21 to the removal processing unit 22 may be performed on each image with a different scale so that processes of from the feature quantity generation processing unit 23 to the transformation matrix computation processing unit 25 are performed using the feature points detected from each image with a different scale. Note that the position of the feature point detected from each image with a different scale or the matching point is transformed into a position corresponding to an image with a predetermined scale, for example, a position corresponding to an input image, and then a transformation matrix computation process and a feature quantity generation process are performed using the position of the feature point or the matching point after the transformation.

The restricted number of feature points may be a preset value, or be set in accordance with the block size or the block position. For example, the restricted number of feature points may be set to x½ for a block whose block size is ½. Meanwhile, when it is obvious that a desired object is located at a position within a specific range, the restricted number of feature points in blocks outside the specific range may be set small.

Removal of the feature points may also be performed by splitting a three-dimensional region, which is obtained by adding a new dimension to a two-dimensional image, into a plurality of regions and removing some feature points from each split region so that the remaining feature points are uniformly dispersed in the three-dimensional space. For example, in detection of feature points, not only the position (x,y) in the image, but also an image with a different scale (s) is used. In such a case, it is considered that feature points are distributed across the three-dimensional space of (x,y,s). Such a space is split into rectangular parallelepipeds and the upper limit of the number of feature points included in each rectangular parallelepiped is set, and then the feature points are removed in order of increasing reliability so that the number of the remaining feature points in each rectangular parallelepiped is within the upper limit. By performing such a removing process on each rectangular parallelepiped, it becomes possible to remove feature points with a simple configuration at a high speed so that the remaining feature points are dispersed in a spatially uniform manner even in the three-dimensional space. In addition, it is also possible to, in a two-dimensional space on the X-Y plane, remove feature points from a three-dimensional space including a Z-direction that intersects the XY plane at right angles so that the number of the remaining feature points are dispersed in a spatially uniform manner.

As described above, according to the present technology, it is possible to remove feature points in a spatially uniform manner, thereby improving the accuracy of feature point matching. In addition, it is also possible to perform alignment stably even when there is a small overlapping region between images.

Further, as the feature points with low reliability are removed so that the number of the remaining feature points in the block will be within the restricted number of feature points, the removing process can be performed with a simple configuration at a high speed. Thus, alignment can be performed at a high speed even in a device with limited built-in resources.

A series of processes described in this specification can be executed by any of hardware, software, or both. When a process is executed by software, a program having a processing sequence recorded thereon is installed on memory in a computer, which is built in dedicated hardware, and is then executed. Alternatively, a program can be installed on a general-purpose computer that can execute various processes, and then executed.

For example, the program can be recorded on a hard disk or ROM (Read Only Memory) as a recording medium in advance. Alternatively, the program can be temporarily or permanently stored (recorded) in (on) a removable recording medium such as a flexible disk, CD-ROM (Compact Disc Read Only Memory), MO (Magneto Optical) disk, DVD (Digital Versatile Disc), a magnetic disk, or a semiconductor memory card. Such a removable recording medium can be provided as so-called package software.

In addition, the program can be, not only installed on a computer from a removable recording medium, but also transferred wirelessly or by wire to the computer from a download site via a network such as a LAN (Local Area Network) or the Internet. In such a computer, a program transferred in the aforementioned manner can be received and installed on a recording medium such as built-in hardware.

It should be understood by those skilled in the art that various modifications, combinations, sub-combinations and alterations may occur depending on design requirements and other factors insofar as they are within the scope of the appended claims or the equivalents thereof.

Additionally, the present technology may also be configured as below.

(1) An image processing device comprising:
a feature point detection unit configured to detect feature points from an image;
a reliability computation unit configured to compute reliability of each of the detected feature points; and
a removal processing unit configured to remove some of the detected feature points on the basis of the reliability so that the number of the remaining feature points in each split region that is obtained by splitting the image into a plurality of regions is within a restricted number of feature points.

(2) The image processing device according to (1), wherein the removal processing unit sequentially removes the feature points in order of increasing reliability.

(3) The image processing device according to (1) or (2), wherein the removal processing unit sets the restricted number of the feature points in each region.

(4) The image processing device according to any one of (1) to (3), wherein
the feature point detection unit detects a corner as a feature point from the image, and
the reliability computation unit sets a strength of the corner as the reliability.

(5) The image processing device according to any one of (1) to (3), wherein
the feature point detection unit extracts the feature point on the basis of scale images, the scale images having been generated by smoothing the image with a predetermined smoothness in a stepwise manner, and
the reliability computation unit uses a difference value between the scale images as the reliability.

(6) The image processing device according to any one of (1) to (5), wherein the removal processing unit splits a three-dimensional region into a plurality of regions, and removes feature points from each split region, the three-dimensional region being obtained by adding a new dimension to the two-dimensional image.

(7) The image processing device according to (6), wherein the removal processing unit sets the three-dimensional region by including a scale into the two-dimensional image.

In the image processing device, the image processing method, and the program of the present technology, feature points are detected from an image. In addition, the reliability of each of the detected feature points is computed. Further, the image is split into a plurality of regions, and some of the detected feature points are removed on the basis of the reliability so that the number of the remaining feature points in each split region is within a preset restricted number of feature points. Therefore, the feature points can be removed in a spatially uniform manner with a simple configuration at a high speed. Thus, when an identical object is searched for on the basis of the correspondence relationship between feature points of a plurality of images, the identical object can be searched for efficiently. Further, it becomes possible to, for example, easily generate a panoramic image by accurately joining images such that the object image will have no missing parts or overlapping parts.

The present application contains subject matter related to that disclosed in Japanese Priority Patent Application JP 2011-100836 filed in the Japan Patent Office on Apr. 28, 2011, the entire content of which is hereby incorporated by reference.

What is claimed is:

1. An image processing device comprising:
one or more processors operable to:
detect feature points from an image;
compute reliability of each of the detected feature points; and
remove at least one detected feature point from each split region of a plurality of split regions on the basis of the reliability so that a number of remaining feature points in each of the plurality of split regions is within a predetermined number associated with corresponding split region being processed, wherein the predetermined number for each of the split regions is determined based on position of the corresponding split region within the image, wherein the plurality of split regions is obtained by splitting the image, wherein the predetermined number for each of the split regions is determined based on position of an object within the image, wherein a first split region located within a specific range of the object has a predetermined number larger than a second split region located at a position outside the specific range.

2. The image processing device according to claim 1, wherein the one or more processors are operable to remove the detected feature points sequentially from each of the plurality of split regions in order of increasing reliability.

3. The image processing device according to claim 1, wherein the one or more processors are operable to set the predetermined number for each of plurality of the split regions.

4. The image processing device according to claim 1, wherein
a feature point is a corner from the image, and
the reliability is computed based on a strength of the corner.

5. The image processing device according to claim 1, wherein the one or more processors are operable to:
detect the feature points based on scale images, wherein the scale images are generated by smoothing the image with a predetermined smoothness in a stepwise manner; and
compute the reliability based on a difference value between the scale images.

6. The image processing device according to claim 1, wherein the one or more processors are operable to split a three-dimensional region into the plurality of split regions.

7. The image processing device according to claim 6, wherein the three-dimensional region comprises different scale two-dimensional images.

8. An image processing method comprising:
detecting feature points from an image;
computing reliability of each of the detected feature points; and
removing at least one detected feature point from each split region of a plurality of split regions on the basis of the reliability so that a number of remaining feature points in each of the plurality of split regions is within a predetermined number associated with corresponding split region being processed, wherein the predetermined number for each of the split regions is determined based on position of the corresponding split region within the image, wherein the plurality of split regions is obtained by splitting the image, wherein the predetermined number for each of the split regions is determined based on position of an object within the image, wherein a first split region located within a specific range of the object has the predetermined number larger than a second split region located at a position outside the specific range.

9. A non-transitory computer-readable storage medium having stored thereon, a computer program having at least one code section for image processing, the at least one code section being executable by a device for causing the device to perform steps comprising:
in an image processing device:
detecting feature points from an image;
computing reliability of each of the detected feature points; and
removing at least one detected feature point from each split region of a plurality of split regions on the basis of the reliability so that a number of remaining feature points in each of the plurality of split regions is within a predetermined number associated with corresponding split region being processed, wherein the predetermined number for each of the split regions is determined based on position of the corresponding split region within the image, wherein the plurality of split regions is obtained by splitting the image, wherein the predetermined number for each of the split regions is determined based on position of an object within the image, wherein a first split region located within a specific range of the object has the predetermined number larger than a second split region located at a position outside the specific range.

10. The non-transitory computer-readable storage medium according to claim 9, wherein the detected feature points are sequentially removed from each of the split regions of the plurality of split regions in order of increasing reliability.

11. The non-transitory computer-readable storage medium according to claim 9, wherein
a feature point is a corner from the image, and
the reliability is computed based on a strength of the corner.

12. The non-transitory computer-readable storage medium according to claim 9, wherein
the feature points are detected based on scale images, wherein the scale images are generated by smoothing the image with a predetermined smoothness in a stepwise manner, and
the reliability is computed based on a difference value between the scale images.

13. The image processing method according to claim 8, further comprising sequentially removing the detected feature points from each of the plurality of split regions in order of increasing reliability.

14. The image processing method according to claim 8, wherein
a feature point is a corner from the image, and
the reliability is computed based on a strength of the corner.

15. The image processing method according to claim 8, further comprising:
detecting the feature points based on scale images, wherein the scale images are generated by smoothing the image with a predetermined smoothness in a stepwise manner; and
computing the reliability based on a difference value between the scale images.

* * * * *